United States Patent [19]

Moore

[11] Patent Number: 5,048,089
[45] Date of Patent: Sep. 10, 1991

[54] PORTABLE, REMOVABLY ATTACHED SPEAKER ASSEMBLY

[76] Inventor: Patrick G. Moore, 2539 S. Bayshore Dr., Apt. 118, Miami, Fla. 33133

[21] Appl. No.: 441,327

[22] Filed: Nov. 27, 1989

[51] Int. Cl.⁵ .................... H04R 1/02; H04R 25/00; H04B 1/00
[52] U.S. Cl. .................................. 381/87; 381/86; 381/188
[58] Field of Search ............ 181/141; 312/7.1 R; 381/24, 86, 87, 88, 124, 188, 189, 205; 439/34, 73, 296, 297, 298, 345, 346, 366, 374, 470, 527, 544, 550, 574; 455/345, 346; 248/551, 553

[56] References Cited

U.S. PATENT DOCUMENTS

| 3,071,728 | 1/1963 | Grace et al. | 455/346 |
| 4,546,850 | 10/1985 | Litner | 181/141 |
| 4,580,653 | 4/1986 | Owens | 181/141 |
| 4,733,748 | 3/1988 | Pontirelli, Jr. | 181/141 |
| 4,752,962 | 6/1988 | Thiele et al. | 381/194 |
| 4,847,907 | 7/1989 | Ando | 381/86 |

FOREIGN PATENT DOCUMENTS

| 0029007 | 3/1977 | Japan | 439/527 |
| 0004441 | 1/1982 | Japan | 381/87 |
| 2133248 | 7/1984 | United Kingdom | 381/188 |

OTHER PUBLICATIONS

Motorola, Inc. "DVNA TAC Cellular Mobile Telephone Installation" Jun. 3, 1983.

Primary Examiner—Jin F. Ng
Assistant Examiner—William Cumming
Attorney, Agent, or Firm—Malloy, Downey & Malloy

[57] ABSTRACT

A speaker assembly of the type, but not limited to, used in an automobile or like vehicle which is structured to be portable by virtue of its removable attachment and interconnection to a mounting assembly secured to a support deck in the vehicle or other locale in which it is intended for use. The speakers may be easily removed from the vehicle and carried with the owner for safekeeping or to another location for operative installation which has already been prepared, without use of tools or special expertise.

17 Claims, 3 Drawing Sheets

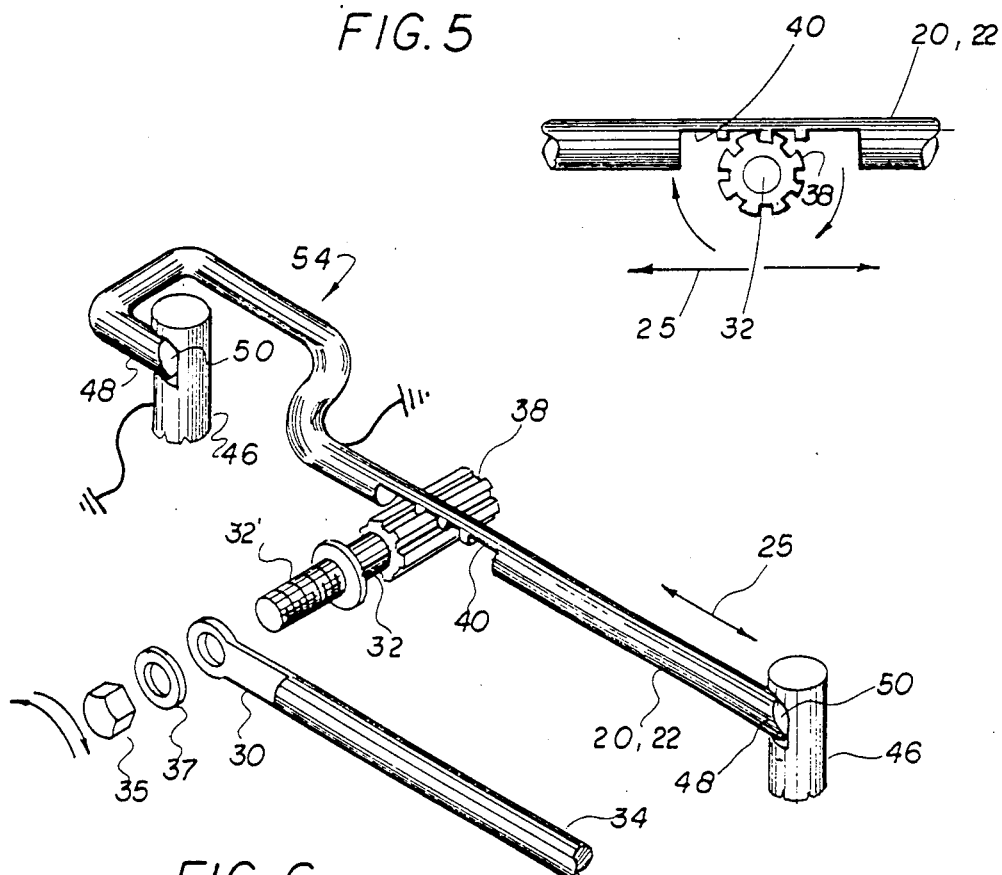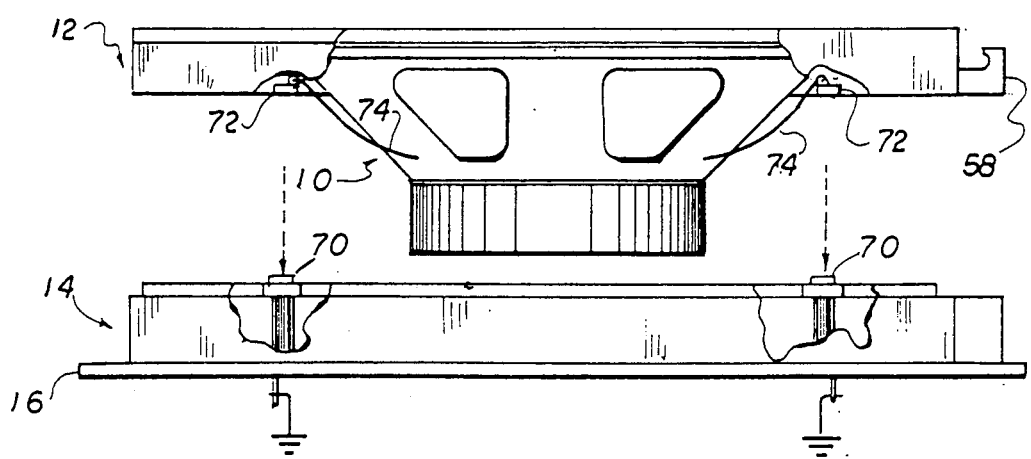

PORTABLE, REMOVABLY ATTACHED SPEAKER ASSEMBLY

BACKGROUND OF THE INVENTION

1. Field of the Invention

The present invention is directed towards a speaker assembly including one or more speaker structures, each removably attached to a mounting assembly secured to a supporting deck which may be located on the interior of a vehicle or in any other applicable location wherein it is desirable to quickly and frequently remove speakers from their operative position for safekeeping or for installing such speakers at another location for operative use.

2. Description of the Prior Art

The existence of speaker assemblies in cooperation with radios, stereo systems, etc. in automobiles or like vehicles has been known for many years. However, modern technology has developed the "stereo system" art to the point wherein hi-fidelity sound is readily available in automobiles or like vehicles as well as in home entertainment centers or the like. When such expensive and high quality systems are available in automobiles or other readily accessible locations, they are more susceptible to theft. The high cost of such systems, including the speakers associated therewith, also makes them more desirable from the standpoint of being stolen. In order to avoid such theft and also to prevent damage to the vehicle itself which would normally occur upon a thief or vandal breaking into the vehicle, it would obviously be desirable to allow the speakers to be "portable" and thereby removable from the vehicle by the owner for safekeeping.

This concept is known already with radios, stereo systems, etc. in order to prevent theft. However, to date, the concept of easily and quickly removing speakers thereby rendering them "portable" in nature while rendering them usable with a high quality sound system is not known. The U.S. Pat. to Litner, No. 4,546,850, discloses removably attached speakers which incorporate the use of a clip type connector or like device. Similarly, Ponticelli, 4,733,748, discloses the incorporation of plastic serrated slides for the removable attachment of a speaker structure to a mounting or support deck or the like. While the above-noted patents generally disclose the broad concept of removably attached speakers, such structures do not facilitate the removal of such speakers to the extent of requiring tools or a certain amount of expertise or knowledge of the structure itself in order to effectively remove the speaker structures form their mounts without damage thereof. Also, the time consumed in removing and reinstalling said speakers is questionable from the standpoint of convenience which would be a necessity for a user to continuously and repeatedly remove said speakers, for safekeeping or for reinstallation at another location, thereby rendering them "portable" in nature.

In addition, the U.S. Pat. No. 4,752,962 to Thiele et al. discloses a loud speaker unit including a frame serving as a sound guide to which a loud speaker chassis having a substantially circular configuration is releasably fastened and further including form locking cooperating detent means which are specifically structured to allow for the mounting and/or installation of the speaker structures by automatic machinery. Again, such a structure is not readily adaptable to overcome the problems of allowing a preferred speaker structure or assembly to be essentially portable.

Accordingly, there is a need in the prior art for a mounting and/or locking mechanism incorporated in one or more speaker structures which affords solid mounting engagement of the speaker on the support deck or mount and a complete and reliable electrical interconnection and standardization of mounting surfaces that is usable with any six inch by nine inch speaker size or any other substantially conventional speaker size and configuration. Such a preferred assembly should be capable of literally thousands of removals/installations without the need for tools or special knowledge of the structure of the assembly so as to facilitate such a removal and installation in a minimum of time and inconvenience to the user or owner of such structures.

SUMMARY OF THE INVENTION

The present invention is directed to a speaker assembly of the type which is essentially portable to the extent that it is easily removed and reinstalled on a mounting assembly attached to or being an integral part of a support deck. Such speaker assemblies may be readily adaptable for use in automobiles or like vehicles wherein theft is more prevalent. However, it should be emphasized that such a removable attachment of one or more speaker structures is not limited to vehicular use.

The assembly of the present invention comprises a mounting assembly which may be secured to any type of support deck. A base is removably attached thereto wherein the base and a portion of the mounting assembly may be congruently configured into a substantially ring like configuration. In another embodiment also to be considered within the scope of the present invention, the base may be considered as a normally manufactured part of the speaker structure rather than being "retrofitted" or otherwise attached thereto after manufacture of the speaker assembly. A locking mechanism is incorporated in the base and comprises, in a preferred embodiment to be described in greater detail hereinafter, a bracket means comprising two spaced apart brackets, each having an elongated configuration and movably disposed on the interior of spaced apart hollow elongated portions of the base. Such hollow portions may be accurately referred to as elongated channels which are configured to allow "linear" movement of the respective locking brackets defining the bracket means therein. The locking mechanism may also comprise a plurality of locking posts secured to the mounting assembly and extending upwardly and outwardly therefrom into engagement with the base attached to the speaker structure. The plurality of posts may preferably be at least four in number wherein two paris of posts are provided and each pair are disposed to cooperate in locking engagement with opposite ends of one of the brackets. To accomplish this and, as set forth above, based on the fact that each of the brackets are linearly movable within separate spaced apart channels, the posts and more specifically, receiving portions thereof are positionable into the interior of the channels and into aligned registry with the opposite ends or other portions of the locking brackets which lockingly engage such posts.

A handle means is provided to facilitate carrying and supporting the speaker structures once they are removed from their operative attachment to the mounting assembly. In addition, the handle means is also structured and more specifically, interconnected to the brackets to accomplish their selective movement into and out of locking engagement with the plurality of posts.

More specifically, the handle means is movable between a stored position and an operative position. In the stored position, the handle means is positioned in essentially co-planar or parallel relation to the base and specifically, in an "out of the way" location relative to the face of the speaker.

The operative position finds the handle means in an outwardly extending, somewhat upright position to facilitate carrying of the speaker structure in a depending but supported position. When the operator or user moves the handle means from its stored position to its operative position, interconnection between the handle means and the two locking brackets causes their forced movement out of locking engagement with the plurality of posts. Therefore, it should be readily apparent that the bracket means comprising the two brackets are selectively movable between a locked position and a non-locked position depending upon the orientation of the handle means. It is further important to note that no other tools or manipulation of the structure of the speaker and/or mounting assembly is required to remove and/or install the speaker structure relative to the support or mounting deck to which the mounting assembly is secured. Electrical connecting means are mounted both on the base and on the mounting assembly and are further disposed into electrical connection with a source of electrical power so as to supply current to the speakers for their use. Such electrical connecting means may be automatically interconnected and "activated" upon fixed but removable attachment of the base to the mounting assembly when the handle means is positioned in the stored position and the locking brackets are disposed in locking engagement with the plurality of posts.

In a preferred embodiment, the electrical connecting means may in fact be established by the plurality of posts being connected to plus (+) and minus (−) terminals of an electrical input from a conventional electrical source and the locking bracket serving to establish electrical connection with the speaker assembly once they are disposed in locking engagement with the corresponding post.

BRIEF DESCRIPTION OF THE DRAWINGS

For a fuller understanding of the nature of the present invention, reference should be had to the following detailed description taken in connection with the accompanying drawings in which.

Figure 1:
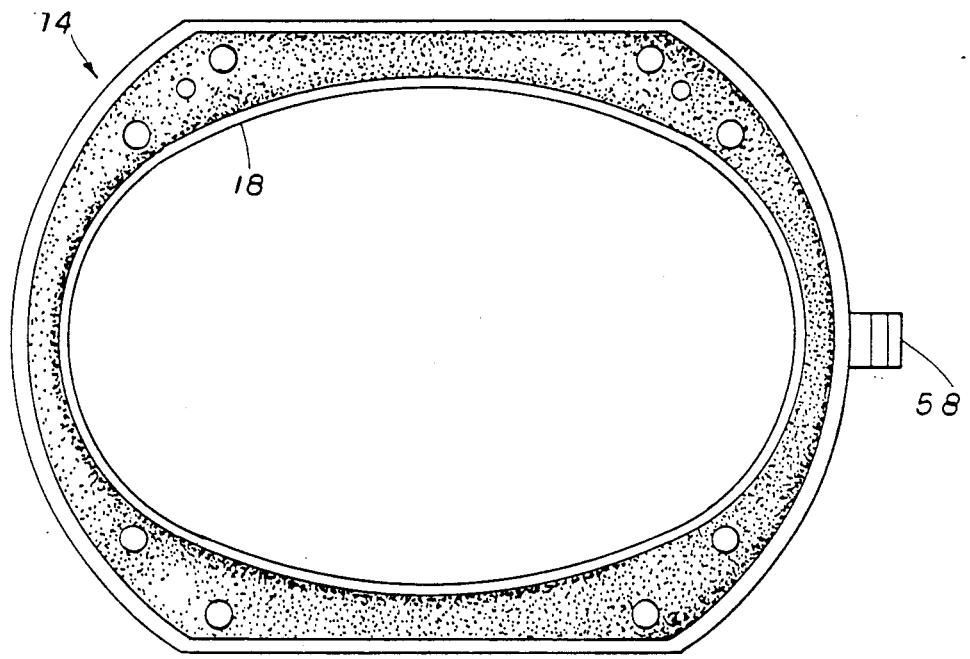
FIG. 1 is a top plan view of the mounting assembly and mounting or support deck to which it is attached.

FIG. is a detailed view in partial cut-away showing interconnection between a handle portion and locking bracket portion of the assembly.

FIG. 6 is a perspective view in partial cut-away and exploded form of a portion of the embodiment shown in FIG. 5.

FIG. 7 is a side view in partial cut-away of the speaker assembly with the base attached thereto.

Like reference numerals refer to like parts throughout the several views of the drawings.

DETAILED DESCRIPTION OF THE PREFERRED EMBODIMENT

As shown in FIGS. 1 through 8, the present invention is directed to a speaker assembly comprising a speaker structure 10 having a base 12 attached thereto or otherwise structured to be considered a unitary part thereof, such as during the initial production of the speaker 10. Alternately, the base 12 may be attached to the speaker structure 10 in order to adapt it to the removable attachment assembly of the present invention.

Figure 2:
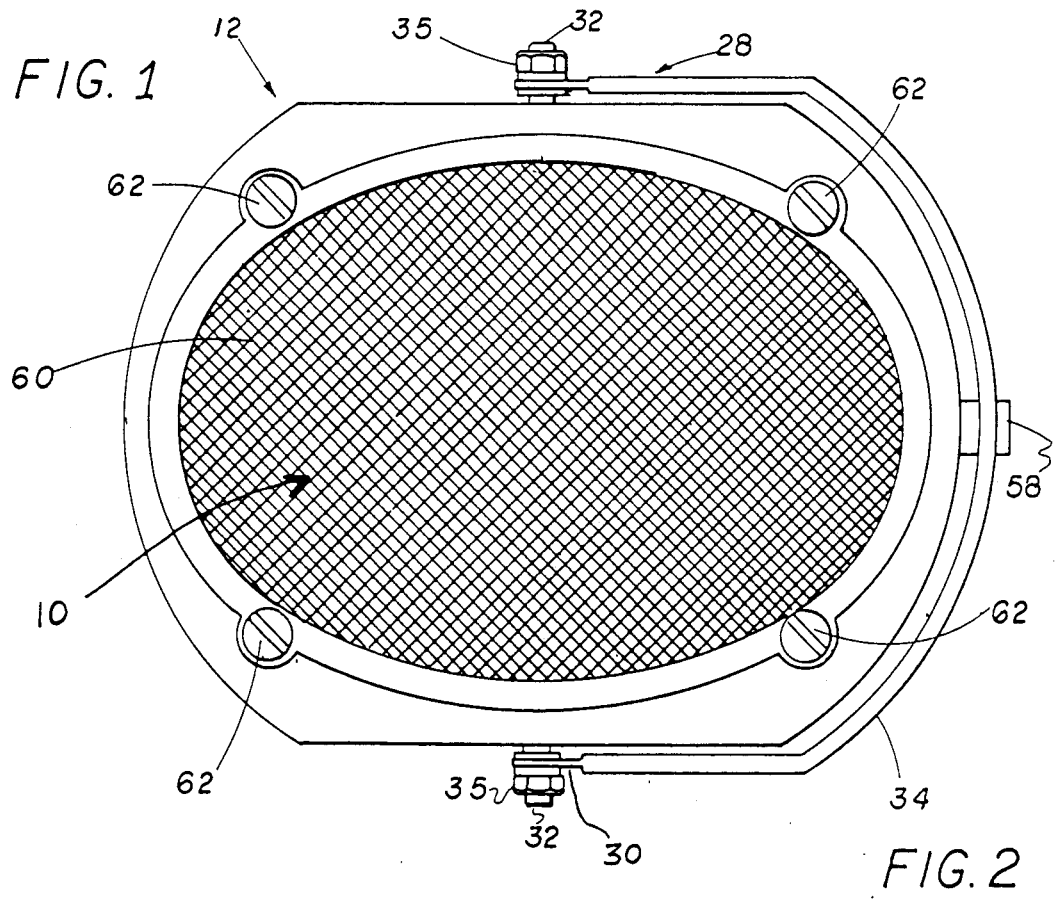
FIG. 2 is a front plan view of the speaker assembly including the base to which the speaker assembly is attached or which may be a part thereof depending on which preferred embodiment is utilized.

Such assembly further includes a mounting assembly 14. As shown in FIGS. 1 and 2, both the mounting assembly and the base 12 are congruently configured into a somewhat ring like configuration. The mounting assembly 14 has a central aperture as at 18 through which the speaker structure 10, in its conventional design and format, passes. Once passed therethrough (see FIG. 3), the clamping engagement between the base 12 and the mounting assembly 14 may occur through the provision of a locking means. The locking means includes a bracket means including preferably two brackets 20 and 22 mounted in the base 12 and more particularly, disposed for linear or longitudinal movement within separate spaced apart channels 24 and 26 respectively (see directional arrows 25 in FIGS. 4 and 6). The aforementioned reciprocal and longitudinal movement of each of the locking brackets 20 and 22 within their respective channels occurs by positioning of the handle means generally indicated as 28. The handle means 28 has its opposite ends as at 30 secured to a spaced apart rotatable shaft 32. The handle means 28 in terms of the handle element 34 may be in the form of a bail type of handle grip. The handle means 28 and the grip portion 34 is selectively positionable between a stored position as represented in solid line sin FIGS. 3 and 4 and an operative position represented in phantom lines in FIG. 3. With reference to FIG. 6., the opposite ends 30 are attached to the respective rotatable shafts 32 by any applicable means. However, in the embodiment shown in FIG. 6., the end portions 30 pass over an externally threaded portion of the rotatable shaft as at 32' and are secured thereto by a nut and washer structure 35 and 37 respectively. Once so secured, a movement of the handle grip 34 between the stored position and the operative position as referred to above serves to rotate the rotatable shaft 32. This in turn rotates pinion gear 38. Rotation of pinion gear 38 in turn causes linear movement (see directional arrow 25 of FIG. 4) within the aforementioned channel 24 or 26 due to the fact that the pinion gear 38 is disposed in mating engagement with a rack gear 40 mounted along the length of each of the locking brackets 20 and 22. (See FIGS. 5 and 6).

Figure 3:
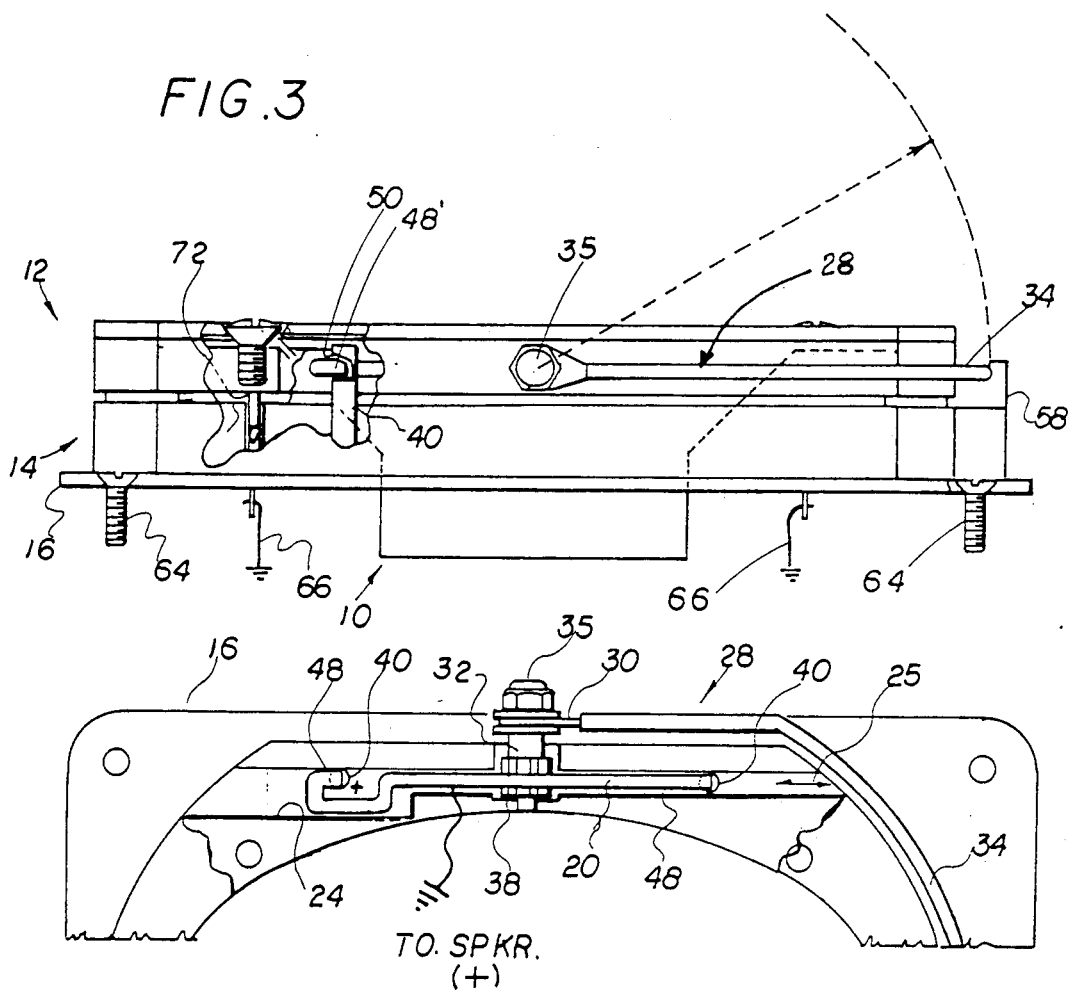
FIG. 3 is an end view in partial cut-away showing interior structural components of the subject assembly.
Figure 4:
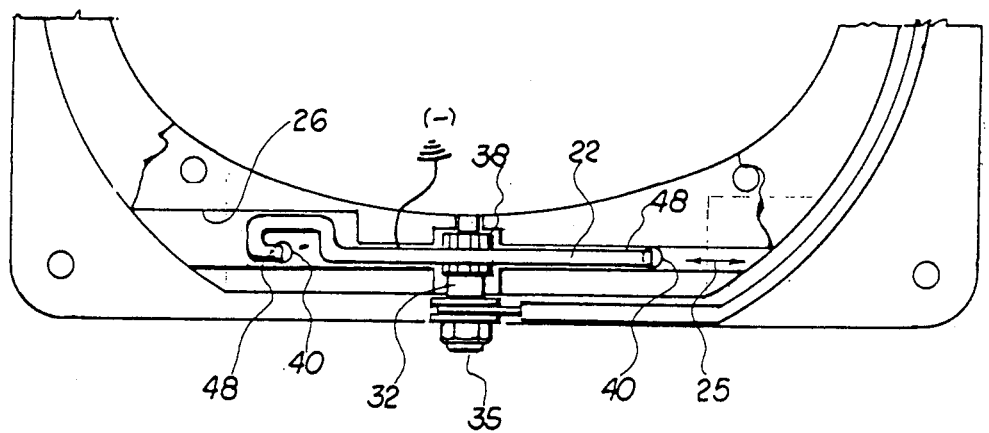
FIG. 4 is a top plan view is partial cut-away showing interior structural components of the assembly.

The locking mechanism further comprises a plurality of posts 46 formed on the mounting assembly 14 and extending upwardly therefrom into the interior of the channels 24 and 26 in aligned registry for locking engagement with the locking brackets 20 and 22 as shown in FIGS. 3, 4 and 6. More specifically, the opposite ends as at 48 of each of the locking brackets 20 and 22 are beveled as shown in FIG. 3. This inclined or beveled configuration is positioned to engage similarly beveled or inclined cutout portions 50 formed on the upper ends of the posts 46. Therefore, the linear or longitudinal movement of each of the brackets 20 and 22 into locking engagement with the posts 46 and more particularly, the inclined portions 50 of the cutout portions of the posts 46 will force the respective brackets 20, 22 and the base 12 in which they are mounted downwardly into a firm, "clamped" confronting engagement with the mounting assembly 14 thereby rendering the interconnection between the base 12 and the mounting assembly 14 essentially vibration free during operation of the speaker structure 10. Also, with reference to FIGS. 4 and 6, each of the locking brackets 20, 22 has a substantially U-shaped end portion as at 54. This U-shaped configuration allows each of the ends 48 and more specifically, the beveled portions 48' thereon to face in a somewhat common direction such that linear or longitudinal travel of each of the brackets 20, 22 will concurrently force each of the ends 48 of each of the brackets 20, 22 into firm clamped and locking engagement with the cutout portions 50 of the correspondingly positioned posts 46. It should readily be apparent, therefore, that the plurality of upstanding posts 46 are arranged into spaced apart pairs such that each post of each pair is disposed in aligned registry with one opposite end 48 of one of the brackets 20, 22. Other structural features of the present invention include a retaining structure as at 58 formed or disposed to receive the bail type grip 34 of the handle means therein so as to removably retain the handle grip 34 in its stored position as shown. Such retaining structure may take a variety of configurations facilitating the removable retention of the grip 34 in the position shown. A locking assembly may also be incorporated in the subject invention in order to ensure that the bail type handle 34 is maintained in its stored position as shown in FIG. 2. Such a locking assembly may take any of a variety of configurations and may typically include a key and lock arrangement wherein the handle 34 is maintained in its stored position by the aforementioned locking assembly thereby resisting or preventing theft thereof since detachment of the assembly cannot be made unless the bail handle is moved to its operative position.

Other features of the present invention include the speaker structure 10 having a shielding grill or the like as at 60 wherein the grill as well as the speaker structure itself may be attached to the base 12 by conventional connector members as at 62. As set forth, the base 12 may be otherwise attached and be considered a unitary construction with the speaker structure 10 during the initial production or formation thereof. Similarly, conventional connectors as at 64 may be used to secure a mounting deck 16 to the interior of the vehicle or in any other cabinet or like assembly in which the subject structure of the present invention is utilized. Electrical connections as at 66 serve to supply electrical current to any type of applicable electrical connectors as at 70 formed on the mounting assembly 14 (see FIG. 8). The electrical connectors 70 mate with the electrical connectors 72 formed on the base 12 and electrically connected to the speaker structure 10 through conventional conductors as at 74. The clamping, confronting engagement of the base 12 to the mounting assembly 14 serves to connect the electrical connectors 70 and 72 into current flowing attachment to one another as shown in FIG. 3.

In another preferred embodiment, means to electrically connect the speaker to a source of electrical power may take place by electrically connecting the posts as at 40 and 46 (see FIGS. 4 and 6) to a conventional source of electrical power. The corresponding locking brackets as at 20 and 22 are similarly connected through proper electrical conductors to the speaker assembly. Accordingly, entering mating engagement into a locking position of the brackets 20 and 22 with the appropriate posts 40 and 46 will serve to establish electrical connection between the electrical power source (not shown) and the speaker assembly. Detachment of the speakers will of course break any type of electrical connection as the speaker assemblies are allowed to be removed from the remainder of the assembly.

Now that the invention has been described,
What is claimed is:

1. A removably attached speaker assembly comprising:
   a) a mounting assembly secured to a support deck and disposed and configured to support a speaker structure thereon,
   b) a plurality of attachment posts secured to said mounting assembly and extending outwardly therefrom,
   c) a base secured to said speaker structure and including a locking mechanism movably mounted thereon and structured for selective disposition between a locked and a non-locked position relative to said posts,
   d) said locking mechanism comprising bracket means selectively positionable into and out of locking engagement with said posts to respectively define said locked and said unlocked positions, handle means connected to said bracket means in driving engagement therewith for selectively positioning said bracket means into and out of locking engagement with said plurality of posts,
   e) said handle means structured to support said assembly when disengaged from said mounting assembly to facilitate carrying thereof, and
   f) electrical connecting means for interconnecting said mounting assembly and said base and electrically attach to a source of electrical power for supplying electrical current to the speaker structure.

2. An assembly as in claim 1 wherein said handle means is selectively positionable between an operative and a stored position, said operative position defined by a substantially outwardly extending orientation of said handle means and said stored position defined by a substantially parallel orientation relative to said base.

3. An assembly as in claim 2 wherein said handle means and said bracket means are cooperatively structured and interconnect to position said bracket means out of locking engagement with said plurality of posts when said handle is in said stored position.

4. An assembly as in claim 3 wherein said handle means and said bracket means are interconnected and cooperatively structured to position said bracket means into said locking engagement with said plurality of posts when said handle means is in said stored position.

5. An assembly as in claim 1 wherein said base comprises a hollow interior portion, said bracket means selectively movable, upon movement of said handle means, within said hollow interior portion and between said locked and non-locked positions.

6. An assembly as in claim 5 wherein said hollow interior portion comprises at least one elongated channel, said bracket means comprising at least one bracket movably mounted within said channel and positionable such that substantially opposite end portions thereof are disposed into and out of locking engagement with correspondingly positioned posts disposed on the interior of said channel upon mating, supporting engagement of said base means on said mounting assembly.

7. An assembly as in claim 5 wherein said bracket means comprises two locking brackets, each drivingly connected to said handle means and selectively positionable into and out of locking engagement with correspondingly positioned ones of said posts, said posts disposed on the interior of a corresponding one of two elongated, spaced apart channels and into aligned registry with one of said two brackets.

8. An assembly as in claim 7 wherein each of said opposite ends of each of said locking brackets are disposed into and out of locking engagement with a correspondingly positioned one of said plurality of posts, each of said opposite ends of said brackets having a beveled configuration cooperatively configured to engage a receiving portion of one of said posts so as to frictionally engage on another and concurrently force said base and said mounting assembly into clamped engagement with one another.

9. An assembly as in claim 8 wherein one end of each of said locking brackets comprises a substantially U-shaped configuration oriented so as to direct said beveled configuration of said opposite ends in a common direction.

10. AN assembly as in claim 1 wherein said bracket means comprises two brackets, each having a substantially elongated configuration and movably mounted on opposite sides of said base, each of said brackets having oppositely disposed end portions which are each positionable into and out of locking engagement with a correspondingly positioned one of said plurality of posts upon movement of said bracket means between said locked and said unlocked positions.

11. An assembly as in claim 10 further comprising a gear assembly including a pair of first gear members, each mounted on said handle means and movable therewith, said gear assembly comprising a pair of second gear members, each formed on one of said locking brackets and disposed and configured for mating, driven engagement by a correspondingly positioned one of said first gear members upon movement of said handle means between said locked and said non-locked positions.

12. An assembly as in claim 11 wherein each of said pair of first gear members comprises a pinion gear secured to said handle means and rotatable therewith upon disposition of said handle means between a stored and an operative position; and further wherein each of said second gear members comprise elongated rack gears, each mounted along the length of a different one of said locking brackets and disposable in mating, driven engagement with a correspondingly positioned pinion gear.

13. An assembly as in claim 12 wherein each of said locking brackets concurrently move longitudinally into and out of locking engagement with correspondingly positioned ones of said plurality of posts to define said locked and non-locked positions of said locking mechanism.

14. An assembly as in claim 13 wherein said base comprises two spaced apart elongated channels, each disposed and dimensioned to house and allow longitudinal movement therein of one of said locking brackets, said plurality of posts positionable into the interior of said channels and into aligned registry with opposite ends of each of said brackets, said brackets selectively movable into and out of locking engagement with said plurality of posts upon selective disposition of said handle means between said stored and said operative positions.

15. An assembly as in claim 1 wherein said electrical connecting means comprises said posts and said bracket means being formed at least in part of electrically conductive material, said posts connected to the source of electrical power, said bracket means electrically connected to the speaker structure, whereby locking engagement between the bracket means and the posts establish current flow to the speaker structure.

16. An assembly as in claim 1 further comprising a gripping means secured to said mounting assembly and disposed in receiving engagement with said handle means and removably secured thereto so as to removably maintain said handle means in a stored position relative to said mounting assembly.

17. An assembly as in claim 1 wherein said base and said mounting assembly both comprise congruently configured attachment rings disposable in confronting, mating engagement with one another and removably secured to firmly clamped relation to one another when said bracket means is disposed in said locked position.

* * * * *